United States Patent [19]

Whitman et al.

[11] 3,893,042

[45] July 1, 1975

[54] LOCK INDICATOR FOR PHASE-LOCKED LOOPS

[75] Inventors: Edward C. Whitman, Laurel; George B. Blake, Greenbelt, both of Md.

[73] Assignee: The United States of America as represented by the Secretary of the Navy, Washington, D.C.

[22] Filed: Dec. 12, 1973

[21] Appl. No.: 423,967

[52] U.S. Cl. ............... 331/55; 328/133; 307/233 R; 307/216; 307/219

[51] Int. Cl.² ........................................... H03F 3/26

[58] Field of Search ......... 328/133, 155; 307/233 R, 307/233 A, 219, 232, 216; 331/2, 49, 55; 324/83 D

[56] References Cited

UNITED STATES PATENTS

| | | | |
|---|---|---|---|
| 3,369,190 | 2/1968 | Pope | 331/55 |
| 3,370,251 | 2/1968 | Overstreet | 331/55 |
| 3,435,194 | 3/1969 | Peschon et al. | 307/216 X |
| 3,588,710 | 6/1971 | Masters | 328/133 |
| 3,662,277 | 5/1972 | White | 331/49 |
| 3,671,876 | 6/1962 | Oshiro | 307/216 |
| 3,721,909 | 3/1973 | Pincus | 328/133 |

*Primary Examiner*—Michael J. Lynch
*Attorney, Agent, or Firm*—R. S. Sciascia; J. A. Cooke; Sol Sheinbein

[57] ABSTRACT

Apparatus for indicating that a phase-locked loop has locked onto a periodic signal utilizing a second auxiliary phase-locked loop to which the incoming signal is fed in parallel with the primary phase locked loop. If the signal is acquired by both, an exclusive OR gate produces a continuous zero output, indicating that a lock-up has occurred.

4 Claims, 7 Drawing Figures

$f_P$ : PRIMARY LOOP CENTER FREQUENCY
$f_A$ : AUXILIARY LOOP CENTER FREQUENCY

LOCK INDICATOR FOR PHASE-LOCKED LOOPS

BACKGROUND OF THE INVENTION

The present invention relates to phase-locked loops and more particularly to a device for indication that a phase-locked loop has acquired and locked onto a periodic signal.

Phase-locked loops are widely used in electronic communication systems for the conditioning of noisy waveforms, for signal detection in high noise backgrounds, and for synchronization and timing functions. The heart of the loop is a voltage-controlled oscillator (VCO) which provides a square or sinusoidal waveform whose frequency is determined by a dc control voltage. The incoming signal, normally a sinusoid or other periodic waveform corrupted by additive noise, is compared with the VCO output in a phase detector, which supplies a voltage indicative of the instantaneous phase difference between the input and VCO signals. This difference signal is smoothed in a low pass loop filter to yield a slowly varying control voltage fed back to set the frequency of the VCO. The negative feedback action of the loop acts to shift the VCO frequency in the direction that decreases the phase discrepancy between the two waveforms. Under no-input conditions, the VCO runs at a center frequency corresponding to zero control voltage. When a periodic input appears, however, the loop's feedback pulls the VCO frequency toward that of the incoming wave until they correspond, at which point the phase difference reaches a stable 90°, and the loop is said to be "locked up." If the incoming frequency of the input signal changes in time, the device will track the incoming frequency such that the VCO stays in step. Thus, even when the input is badly corrupted by noise, the VCO will provide a clean high-quality waveform in frequency synchronism with the incoming signal. In effect, the loop acts as a very narrow band adaptively tuned filter for separating a periodic signal from noise. As the background noise increases in level, however, the frequency range over which the loops will acquire and track an incoming signal is gradually narrowed until finally, for extremely adverse signal-to-noise ratios, the device will not function at all, and the VCO frequency again will merely jitter around its free-running value.

In many communication applications where a phase-locked loop is used to track an incoming carrier against a fluctuating noise background, an electronic logic signal is required to indicate when the loop has achieved a locked condition. This can be used, for example, as an enabling signal for energizing certain subsystems of a receiver only when an incoming carrier is detected. Lock indication for noisy inputs has long been a vexing problem for users of phase-locked loops. The standard technique for deriving a lock indication has been based on the fact that a constant 90° phase shift appears between the VCO output and the signal component of the input when the loop is locked. By taking one of these signals and shifting it an additional 90°, normally in a simple lag network, the result will be in phase with the unshifted signal, and when multiplied by it in some manner of electronic multiplier will provide a product with a substantial dc value which can be detected in smoothing and thresholding circuitry. Such a system is known as a "quadricorrelator." When dealing with noise signals, however, the quadricorrelator functions very erratically, and it seldom provides a satisfactory lock indication. Fundamentally, this is because one of the signals entering the multiplier is the original noisy input, and the noise component causes severe fluctuations of the resulting product which cannot be smoothed reliably enough to give an unambigous indication of the dc level. The result is frequently a constant "chatter" on the logic signal that destroys its usefulness, and a reliable lock indication cannot be obtained even when the loop has in fact acquired and tracked the incoming signal. This is to say that the traditional method ceases to function before increasing noise levels have actually unlocked the loop.

SUMMARY OF THE INVENTION

Accordingly, there is provided a phase lock indicator system wherein two phase locked loops are utilized, with the incoming signal fed in parallel to the primary and auxiliary phase-locked loops. If the capture ranges of the two loops overlap and the signal is acquired by both, a comparison of the two VCO outputs indicates when lock-up has occurred. The comparison is performed by feeding the VCO signals to separate inputs of an exclusive OR gate. If the two VCO center frequencies are sufficiently different, the exclusive OR gate will produce a steady zero output only when the two loops are locked to the same frequency.

OBJECTS OF THE INVENTION

It is therefore an object of the present invention to provide an unambigous electronic indication that a phase-locked loop operating in a high noise environment has acquired and locked to a periodic signal within its operating bandwidth.

Another object of the present invention is to provide a phaselock indication by comparison of two undistorted signals.

Yet another object of the present invention is to provide a lock indication of a phase-locked loop by comparing its output to that of an auxiliary loop locked to the same signal.

These and other objects, features and advantages of the present invention will become apparent to those skilled in the art as the disclosure is made in the following description of a preferred embodiment of the invention as illustrated in the accompanying sheets of drawings in which:

FIG. 1 illustrates a schematic view of the preferred embodiment of the invention;

FIG. 2(*a*) and 2(*b*) illustrate the waveforms of the output of the two phase-locked loops and exclusive OR gate when the two loops are unlocked and locked respectively;

FIG. 3(*a*), 3(*b*), 3(*c*) illustrate the capture ranges of the two phase-locked as a function of background noise levels; and FIG. 4 is a graph of the input signal frequency limits for lock indication as a function of the input broadband signal to noise ratio for an experimental model of the device.

DESCRIPTION OF THE PREFERRED EMBODIMENTS

Figure 1:
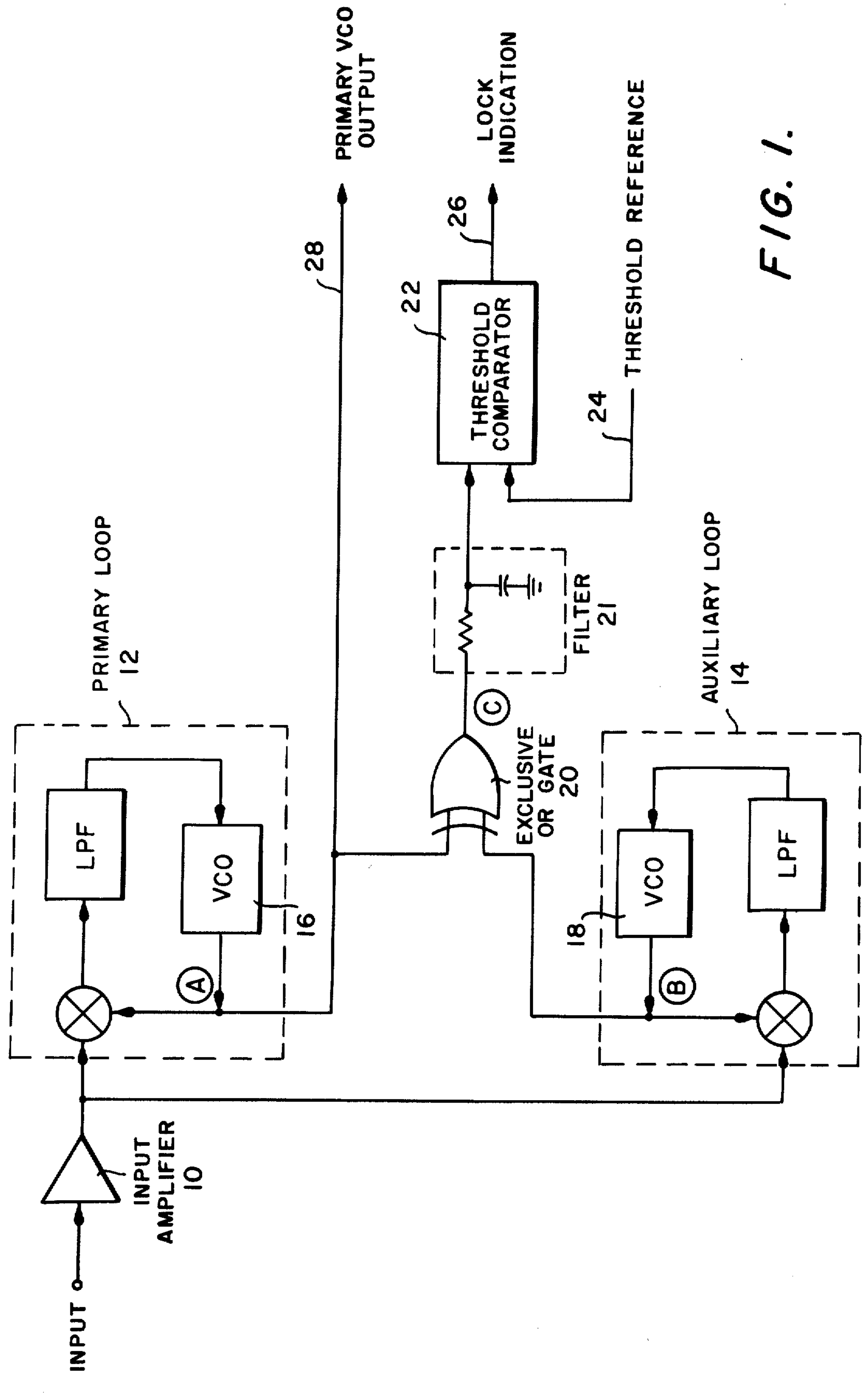

Refering now to FIG. 1 there is shown a preferred embodiment of the invention. The input signal, after being amplified in input amplifier 10, is applied in parallel to both primary phase-locked loop 12 and auxiliary phase-locked loop 14. The free running frequencies of voltage controlled oscillator 16 of primary loop 12 and that of voltage controlled oscillator 18 of auxiliary loop 14 are both tuned near the center of the reception band, but sufficiently displaced from one another to keep the two oscillators from synchronizing on each other due to unavoidable interactions. When operating in a 10 KHz range, a separation of 100 Hz would be sufficient for this purpose. The capture range of primary loop 12 and auxiliary loop 14 overlap, and if the input signal is acquired by both, a comparison of the outputs of voltage controlled oscillator 16 and voltage controlled oscillator 18 indicates very clearly when a lock-up by both loops has occurred. The comparison is performed by feeding the VCO signal A and B to separate inputs of exclusive OR gate 20.

Figure 2A:
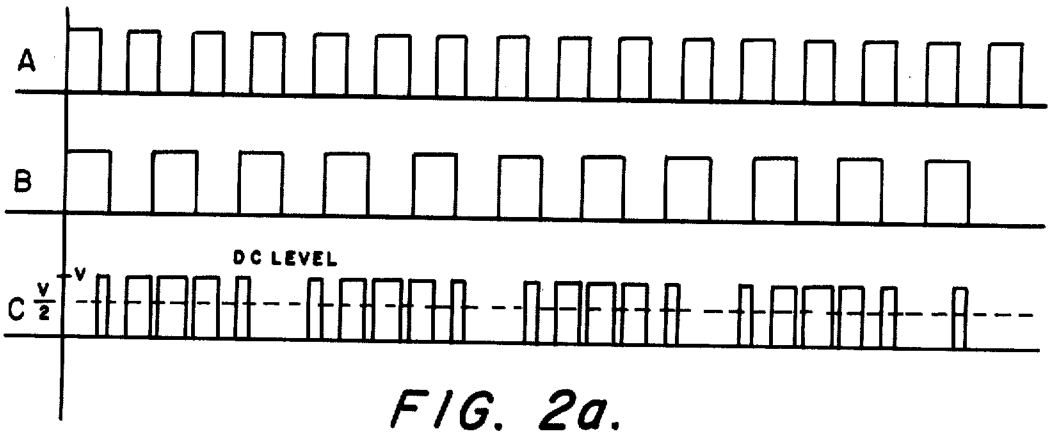
Figure 2B:
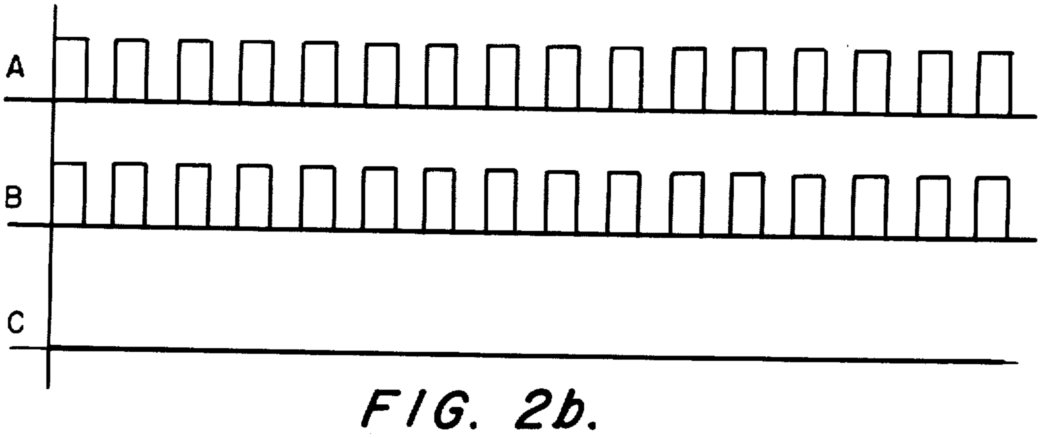

Refering to FIG. 2(*a*), when no appropriate periodic signal is present in the common input to amplifier 10, and only system noise enters phase locked loops 12 and 14, VCO 16 output A and VCO 18 output B will jitter around their respective separate center frequencies. If these are sufficiently different, signal C emerging from exclusive OR gate 20 will appear essentially as a beat waveform with peak value V and a stable long term dc average of V/2. Refering to FIG. 2(*b*), when a signal is introduced at amplifier 10 that locks the primary loop 12, auxiliary loop 14 will lock also, VCO 16 output A and VCO 18 output B become identical, and exclusive OR gate 20 producers a zero output. Output C of Exclusive OR gate 20 is smoothed in filter 21 whose time constant is sufficiently in excess of the period of the beat waveform, wherein the resulting dc average can be readily thresholded in comparator 22 with reference voltage 24 to yield an unambigous indication 26 of when primary loop 12 and auxiliary loop 14 are locked to the same frequency, even under high noise conditions.

Figure 3A:
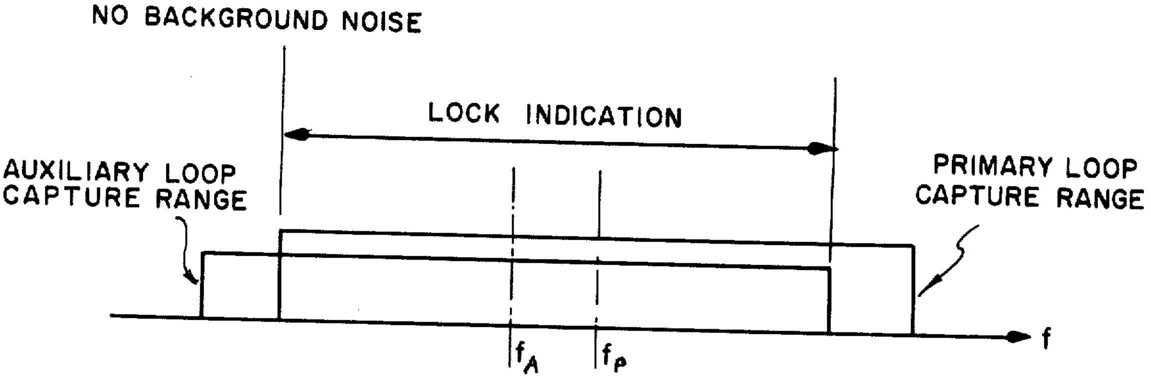
Figure 3B:
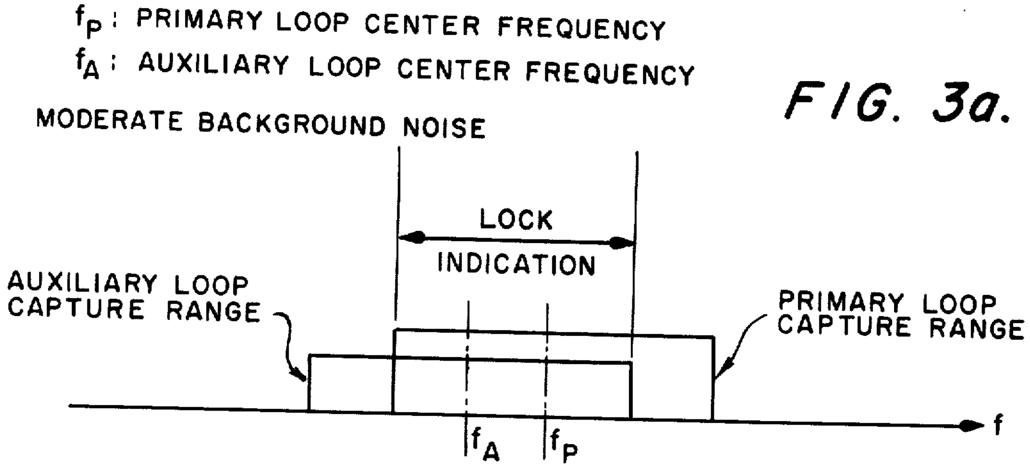
Figure 3C:
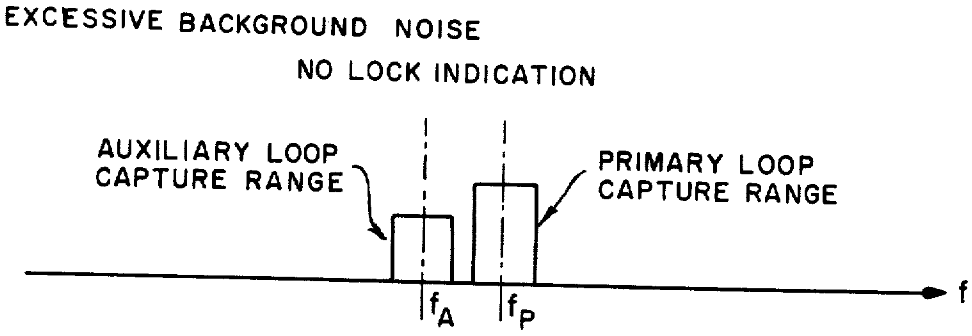

Since the lock indication is effective only for input frequencies lying in the area of overlap between the capture ranges of the two loops 12 and 14 (for a given signal-to-noise ratio), closer alignment of the center frequencies will increase the composite capture range of the entire system. The effects of the background noise level on the capture range are diagrammed in FIGS. 3(*a*), 3(*b*), 3(*c*), where it is seen that the area of overlap decreases as the separate capture ranges of the two loops are limited by increasing noise.

Figure 4:
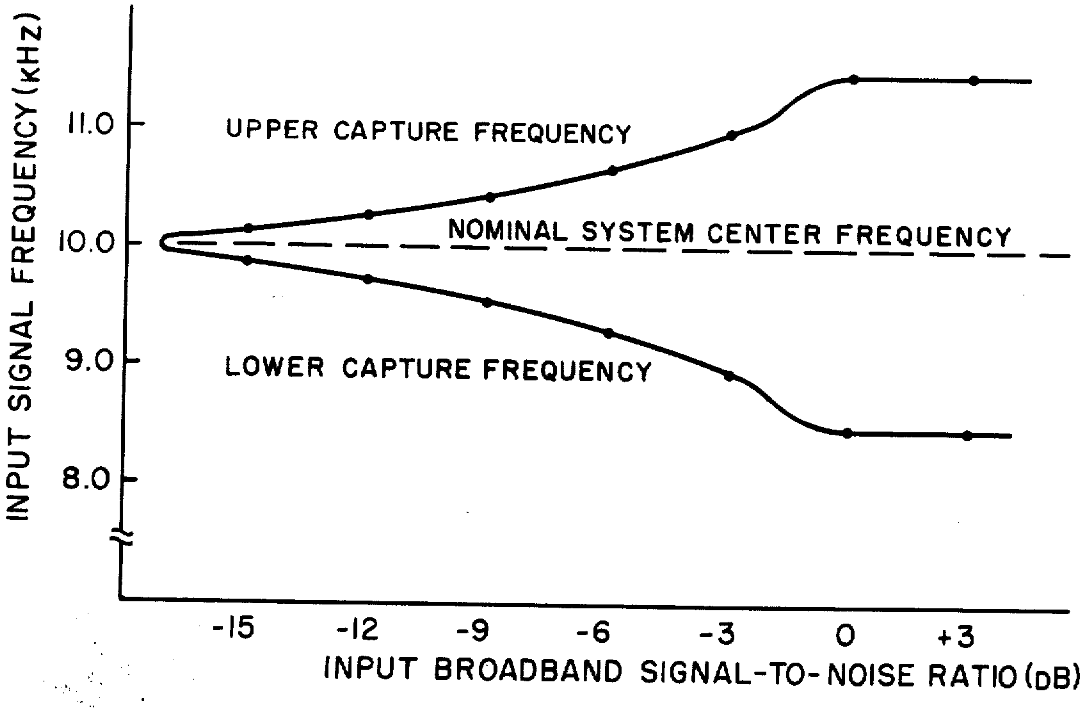

Performance for the present circuit is graphed in FIG. 4 where the upper and lower capture frequencies, as determined by the lock indication, are plotted simultaneously against the input broadband signal-to-noise ratio. The vertical distance between the two curves is the indicated capture range and narrows dramatically as the noise background gets more severe giving a reliable lock indication down to S/N = −15 dB, with marginal operation down to about −17 dB. The locking of the primary loop 12 itself at output 28 is noise-limited as these same signal-to-noise ratios, indicating that the lock indication technique described here remains effective as long as the loop continues to function.

An alternative embodiment can be implemented when dealing with periodic input signals that are rich in harmonics (such as a square wave). The primary loop 12 can then be tuned to the fundamental frequency of the input, whereas the auxiliary loop 14 would be tuned to the vicinity of one of the harmonics. The incoming waveform would lock both loops 12 and 14, and their respective VCO 16 and 18 outputs could be compared to determine the locked condition. In this form of the system, however, the VCO frequency locked to the harmonic would have to be frequency divided to be commensurate with the fundamental. Further, strict isolation of the two loops 12 and 14 would be necessary to avoid inadvertent lock-up of the auxiliary loop 14 by the harmonic of the VCO 16 output of the primary loop 12.

It can therefore be seen that the invention very effectively provides for phase lock indication by employing two clean and undistorted signals, which maintain their quality even under adverse input signal-to-noise ratios. Thus the lock indication remains unaffected by the noise as long as both loops remain locked up. In many applications, a phase-locked loop is used primarily to recover a periodic signal from noise. The prior art quadricorrelator method of lock indication largely sacrified the advantage gained by the loop by recombining the clean signal with the orginial corrupted version. In the present circuit, a second loop is used to provide a clean signal for comparison, and the noise immunity gained by the loops is exploited in the lock indication.

The present lock indication system, suitable for interfacing with other electronic apparatus, is applicable to any electronic system using phase locked loops, particularly for communication and control where carrier synchronization must be indicated to other subsystems.

Obviously many modifications and variation of the present invention are possible in the light of the above teachings. It is therefore to be understood that within the scope of the appended claims, the invention may be practiced otherwise than as specifically described.

What is claimed as new and desired to be secured by Letters Patent of the United States is:

1. A phase-lock indication circuit for indicating a locked condition in a phase-locked loop in response to an incoming periodic signal comprising:

a first phase-locked loop having a VCO center frequency;

an auxiliary phase-locked loop having a VCO frequency slightly different from the center frequency of said first phase-locked loop, wherein the capture range of said auxiliary loop overlaps that of said first loop;

means for applying said incoming signal to said first phase-locked loop and to said auxiliary phase-locked loop; and means for comparing the outputs of said first phase-locked VCO and said auxiliary phase-locked VCO for indicating that said first loop and said auxiliary loop are driven in synchronism by said incoming signals.

2.. A phase lock indication circuit as recited in claim 1 wherein said applying means comprises an amplifier and said comparing means comprises an exclusive OR gate wherein said exclusive OR gate provides a zero output when said first loop and said auxiliary loop are driven in synchronism by said incoming signal.

3. A lock indication circuit as recited in claim 2 further including a smoothing filter and comparator coupled to the output of said exclusive OR gate.

4. A phase lock indication circuit as recited in claim 2 wherein the free running frequency of said first phase-locked VCO and said second phase-locked VCO is approximately 10 KHz and displaced by approximately 100 Hz from each other.

* * * * *